(12) United States Patent
Hino

(10) Patent No.: US 8,094,392 B2
(45) Date of Patent: Jan. 10, 2012

(54) DRIVING DEVICE FOR OPTICAL COMPONENT AND LENS BARREL

(75) Inventor: Mitsuteru Hino, Tokyo (JP)

(73) Assignee: Nikon Corporation, Tokyo (JP)

( * ) Notice: Subject to any disclaimer, the term of this patent is extended or adjusted under 35 U.S.C. 154(b) by 370 days.

(21) Appl. No.: 11/905,285

(22) Filed: Sep. 28, 2007

(65) Prior Publication Data

US 2008/0084621 A1    Apr. 10, 2008

(30) Foreign Application Priority Data

Sep. 29, 2006    (JP) .................................. 2006-268989

(51) Int. Cl.
    *G02B 7/02*    (2006.01)
(52) U.S. Cl. .......................... 359/825; 359/822; 359/830
(58) Field of Classification Search .................. 359/825, 359/830, 811, 815, 817, 819, 822, 823
    See application file for complete search history.

(56) References Cited

U.S. PATENT DOCUMENTS

| | | | |
|---|---|---|---|
| 5,216,314 A | 6/1993 | Suzuki | |
| 5,335,115 A | 8/1994 | Kawai et al. | |
| 5,483,384 A * | 1/1996 | Takizawa et al. | 359/827 |
| 6,002,886 A | 12/1999 | Tamura | |
| 6,008,958 A | 12/1999 | Ishikawa et al. | |
| 6,288,848 B1 | 9/2001 | Shinohara et al. | |
| 2006/0104624 A1* | 5/2006 | Nakata et al. | 396/137 |

FOREIGN PATENT DOCUMENTS

| | | |
|---|---|---|
| EP | 0 878 724 A2 | 11/1998 |
| JP | A 5-328754 | 12/1993 |
| JP | B2 2535079 | 6/1996 |
| JP | A-10-142470 | 5/1998 |
| JP | A-10-170796 | 6/1998 |
| JP | A-2002-250638 | 9/2002 |
| JP | A 2004-208351 | 7/2004 |
| JP | A-2004-323913 | 11/2004 |
| JP | A 2005-148191 | 6/2005 |
| JP | A 2006-280047 | 10/2006 |

OTHER PUBLICATIONS

May 17, 2011 Office Action issued in Japanese Application No. 2006-268989 (with translation only).
Sep. 13, 2011 Office Action issued in Japanese Patent Application No, 2006-268989 (English Translation only).

* cited by examiner

*Primary Examiner* — Ricky L Mack
*Assistant Examiner* — Mahidere S Sahle
(74) *Attorney, Agent, or Firm* — Oliff & Berridge, PLC

(57) ABSTRACT

A driving device for an optical device comprising: an operation ring 3 to which a driving force from an operation member 4 is transmitted; a driving ring 9 to which a driving force from an actuator 20 is transmitted; an output ring 5 which transmits a driving force to an optical component 8*a*; and a planetary roller 6 which slides on one end face 3*b* of said operation ring 3 and one end face 9*b* of said driving ring 9, said planetary roller 6 being rotatably attached to said output ring 5 so as to selectively transmit the driving force from any one of said operation ring 3 and said driving ring 9 to said output ring 5. A sliding face 3*b* of said operation ring 3 with said planetary roller 6 consists of a lower friction member than the operation ring body.

27 Claims, 3 Drawing Sheets

DRIVING DEVICE FOR OPTICAL COMPONENT AND LENS BARREL

BACKGROUND OF THE INVENTION

1. Field of the Invention

The present invention relates to driving device for driving optical components such as lens, and lens barrel comprising the driving device.

2. Description of the Related Art

As shown in Japanese Patent Publication No. 2005-148191, in a lens barrel such as interchangeable lens used for autofocusing single lens reflex camera, there exists a driving device for selectively driving focus lens group to two types of inputs. One of the two types of inputs is a driving force from a driving source such as vibration motor, which acts at automatic focusing, and the other is a driving force by user operation at manually focusing.

In order to transmit two types of inputs selectively, in a conventional driving device, an output ring is arranged, via a planetary roller, between an operation ring to which a driving force acted by user operation is transmitted and a driving ring to which a driving force is transmitted from a driving source such as a vibration motor. A lens housing which supports a lens via an engagement pin and a fork is connected to the output ring, by rotation of the output ring, the lens housing is movable to an optical axial direction.

A user sometimes turns too much an operating grip engaged to the operation ring. Therefore, a driving device has a constitution that faces between the operation ring and the planetary roller or between the driving ring and the planetary roller slip when the user further turns the operating grip after a lens housing has moved to an axial end portion of a movable area. This constitution results in transmitting no excessive force to the lens housing and preventing from breaking the lens housing and the engagement pin etc. Here, an outer circumference of the planetary ring can slip since the driving ring is fixed because of a holding torque between an elastic member and a rotor in the vibration motor.

The holding torque to fix the driving ring depends on a friction coefficient of the elastic member and the rotor in the vibration motor and a pressure force generated by a pressure member. Therefore, it is important to select a material or surface treatment for the elastic member and the rotor in the vibration motor in order to assure a certain level of the holding torque.

Further, it is necessary not to slip largely between the elastic member and the rotor when stopping the vibration motor. Also, it is necessary that the rotor rotates relatively in response to vibration of the elastic member when operating the vibration motor. Namely, in the vibration motor, it is important to select a material or surface treatment for the elastic member and the rotor of the vibration motor, which is difficult.

SUMMARY OF THE INVENTION

The present invention was made in consideration of this situation and an object of the present invention is to provide a driving device available not to slip between an elastic member used in an actuator such as the vibration motor and a rotor even if a holding torque between the elastic member and the rotor is lowered when the motor is electrically disconnected, and a lens barrel using thereof.

In order to achieve the above object, a driving device of an optical component according to a first aspect of the present invention comprises:

an operation ring to which a driving force from an operation member is transmitted;

a driving ring to which a driving force from an actuator is transmitted;

an output ring which transmits a driving force to an optical component; and a planetary roller which contacts with one end face of said operation ring and one end face of said driving ring, said planetary roller being rotatably attached to said output ring so as to selectively transmit the driving force from any one of said operation ring and said driving ring to said output ring; wherein a friction coefficient of a first face, which is a contact face of said operation ring with said planetary roller, is lower than friction coefficient of a second face, which is a contact face of said driving ring with said planetary roller.

A driving method of an optical component according to the first aspect of the present invention comprises:

providing an operation ring to which a driving force from an operation member is transmitted;

providing a driving ring to which a driving force from an actuator is transmitted;

providing an output ring which transmits a driving force to an optical component;

providing a planetary roller which contacts with one end face of said operation ring and one end face of said driving ring, said planetary roller being rotatably attached to said output ring so as to selectively transmit the driving force from any one of said operation ring and said driving ring to said output ring; and making a friction coefficient of a first face, which is a contact face of said operation ring with said planetary roller, lower than friction coefficient of a second face, which is a contact face of said driving ring with said planetary roller.

Said first face of said operation ring may consist of a lower friction member than a body portion of said operation ring.

Said actuator comprises a vibration motor for example.

In the driving device of the optical component and the driving method according to the present invention, the contact face of the operation ring with said planetary roller consists of lower friction member than the operation ring body. Therefore, the optical components driven by the operation ring move to the axial direction end portion of the movable area, and then, faces between the operation ring and the planetary roller preferentially slip (spin free) even if a user turns the operation member further.

Further, in the driving device of the optical components and the driving method according to the present invention when the optical components exist within the axially movable area, the operation ring rotates around the shaft axis as the user turns the operation member. This rotation movement causes to rotate the planetary roller which contacts to the contact face of the operation ring. Then, the driving ring remains stationary by friction torque generated by crimping an elastic member and a rotor of the vibration motor, i.e., holding torque when the motor is electrically disconnected. Therefore, the planetary roller shows sun-and-planet motion while the output ring rotates around a shaft axis X. The output ring rotationally moves at a predetermined moving amount to that of the operation ring.

Further, when the rotor moves by applying an alternating current voltage to the vibration motor as a driving source, the driving ring also rotate around the shaft axis to cause sun-and-planet motion of the planetary roller as with the above described rotation of the operation ring. At this time, the operation ring remains stationary because of the friction torque generated by pressure force of a pressure member to the operation ring for example. Therefore, the output ring also rotates to move by the driving ring as in the above stated rotation of the operation ring.

As stated above, the output ring selectively rotates in response to the two types of inputs of driving forces from the user operation or the driving source. This rotation movement is transmitted to the optical components via the fork fixed to the output ring and the engagement pin, etc., resulting in a desired optical components driving.

Preferably, a rotational axis of said planetary roller is formed in a radial direction of said output ring. Also preferably, an external diameter of said planetary roller is larger than an axial direction width of said output ring.

Preferably, a material of said operation ring comprises fluorine. Also preferably, said material comprising fluorine is polytetrafluoroethylene.

Preferably, the member of said first face comprises fluorine. Alternatively, the member of said first face may be lubricating coating film. Preferably, a thickness of said lubricating coating film is 2 to 30 μm.

A driving device of an optical component of a second aspect of the present invention comprises;

an operation ring to which a driving force from an operation member is transmitted;

a driving ring to which a driving force from an actuator is transmitted;

an output ring which transmits a driving force to an optical component; and a planetary roller which contacts with one end face of said operation ring and one end face of said driving ring, said planetary roller being rotatably attached to said output ring so as to selectively transmit the driving force from any one of said operation ring and said driving ring to said output ring; wherein a contact face of said operation ring with said planetary roller consists of a lower friction member than a body portion of said operation ring.

A driving method of an optical component according to the second aspect of the present invention comprises:

providing an operation ring to which a driving force from an operation member is transmitted;

providing a driving ring to which a driving force from an actuator is transmitted;

providing an output ring which transmits a driving force to an optical component;

providing a planetary roller which contacts with one end face of said operation ring and one end face of said driving ring, said planetary roller being rotatably attached to said output ring so as to selectively transmit the driving force from any one of said operation ring and said driving ring to said output ring; and making a contact face of said operation ring with said planetary roller lower in friction than a body portion of said operation ring.

The driving device of the optical components and the driving method according to the second aspect of the present invention has similar functions and effects as with the above described driving device of the optical components and the driving method according to the first aspect of the present invention.

A lens barrel according to the present invention comprises: any one of the above described driving device;

a converting member to convert a driving force transmitted to said output ring to rectilinear motion; and a lens driven by the converted driving force by said converting member.

BEST MODE FOR CARRYING THE INVENTION

Hereinafter, the present invention will be described based on embodiments shown in drawings.

FIRST EMBODIMENT

Figure 1:
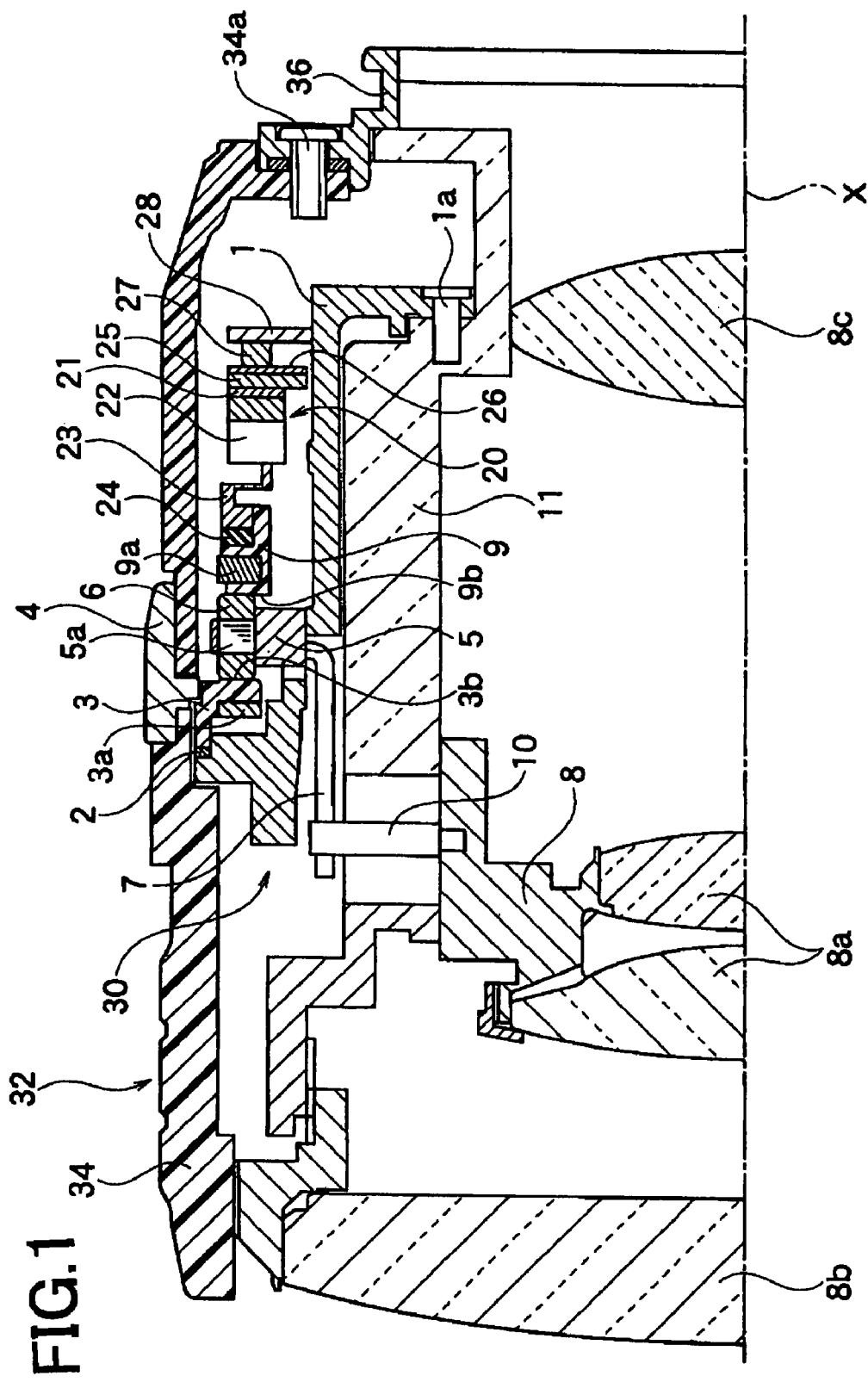
FIG. 1 is a half cross sectional schematic view of a lens barrel having a driving device of one embodiment of the present invention.

As shown in FIG. 1, a lens barrel 32 having a driving device 30 according to a first embodiment of the present invention comprises a fixing cylinder 11, to which a portion or whole portions of lens group 8a to 8c as an optical component are movably applied in an optical axis direction. In the present embodiment, a driving device 30 to move the centrally positioned lens group 8a of the lens groups 8a to 8c toward the optical axis with respect to the fixing cylinder 11 of the lens barrel 32 will be explained.

The driving device 30 comprises a driving device housing 1 that is fixed to the fixing cylinder 11 via a bolt 1a etc. and houses the driving device 30. The driving device 30 comprises the driving device housing 1 having a cylindrical shape and an operation ring 3 attached rotatably around the shaft axis X to the housing 1 via a sliding support ring 2 of low friction member compared to the housing 1.

The operation ring 3 is connected to an operating grip 4 as an operation member, and can be rotated around the shaft axis X simultaneously by rotating operating grip 4 around the shaft axis X to a cylindrical cover 34. Namely, the operation ring 3 is a ring to which a driving torque from the operating grip 4 is input, and is positioned to a radial direction around an outer circumference of the hosing 1 to be rotatable, and is positioned to a thrust direction by the sliding support ring 2 to the housing 1. Note that an operation ring rotation detecting plate 3a in order to detect existence of rotation of the operation ring 3 may be attached to the operation ring 3. However, the operation ring rotation detecting plate 3 is not necessarily provided.

The operating grip 4 is a member that the user directly operates, which is rotatable around the shaft axis X to the cylindrical cover 34 and rotates integrally with the operation ring 3. Note that the shaft axis X is also an optical axis of lenses 8a, 8b and 8c.

The cylindrical cover 34 is fixed to an attachment ring 36 and the fixing cylinder 11 by a bolt 34a, etc. The attachment ring 36 is a portion where the lens barrel 32 is removably attached to a camera body. An unit supporting member 28 is attached to the driving device housing 1, which supports the driving device composed of a vibration motor 20, etc. The unit supporting member 28 is attached to the housing 1 so as to determine a position in the thrust direction of the vibration motor 20 and the whole driving device 30.

Next, the vibration motor 20 of the driving source will be explained.

A piezoelectric 21 is bonded to an elastic member 22, and a progressive wave is generated at an opposite side of the bonding face of the elastic r 22 when alternate current voltage is applied to the piezoelectric 21. The elasticmember 22 and a rotor (moving member) 23 are crimped by a force generated from a pressure member 27, and the rotor 23 rotates around the shaft axis X in response to the progressive wave of the elastic member 22. A rotation force of the rotor 23 is transmitted to the driving ring 9 via an upper absorption member 24 such as a rubber ring.

Note that a support ring 9a, although embedded in the driving ring 9, is not necessarily provided. Also, a lower absorption member 25 composed of nonwoven fabric, etc., and a pressure force adjusting plate 26 for adjusting a pressure force are interposed between the piezoelectric 21 and the pressure member 27.

The output ring 5 arranged between the driving ring 9 and the operation ring 3 along with the shaft axis X is a member to which a driving force from the operation ring 3 or the driving ring 9 is selectively transmitted, and is rotatably attached to the housing 1 at an outer circumference of the housing 1. A fork 7 is fixed at an internal diameter side of the output ring 5, and rotates around the shaft axis X with the rotation of the output ring 5.

An engagement ring 10 is engaged to the fork 7, and also rotates around the shaft axis X with the rotation of the output ring 5. A rotation force of the engagement pin 10 is transmitted to a lens housing 8, and converted to a movement in the shaft axis X direction of the lens 8a by a cam mechanism, etc.

Figure 2:
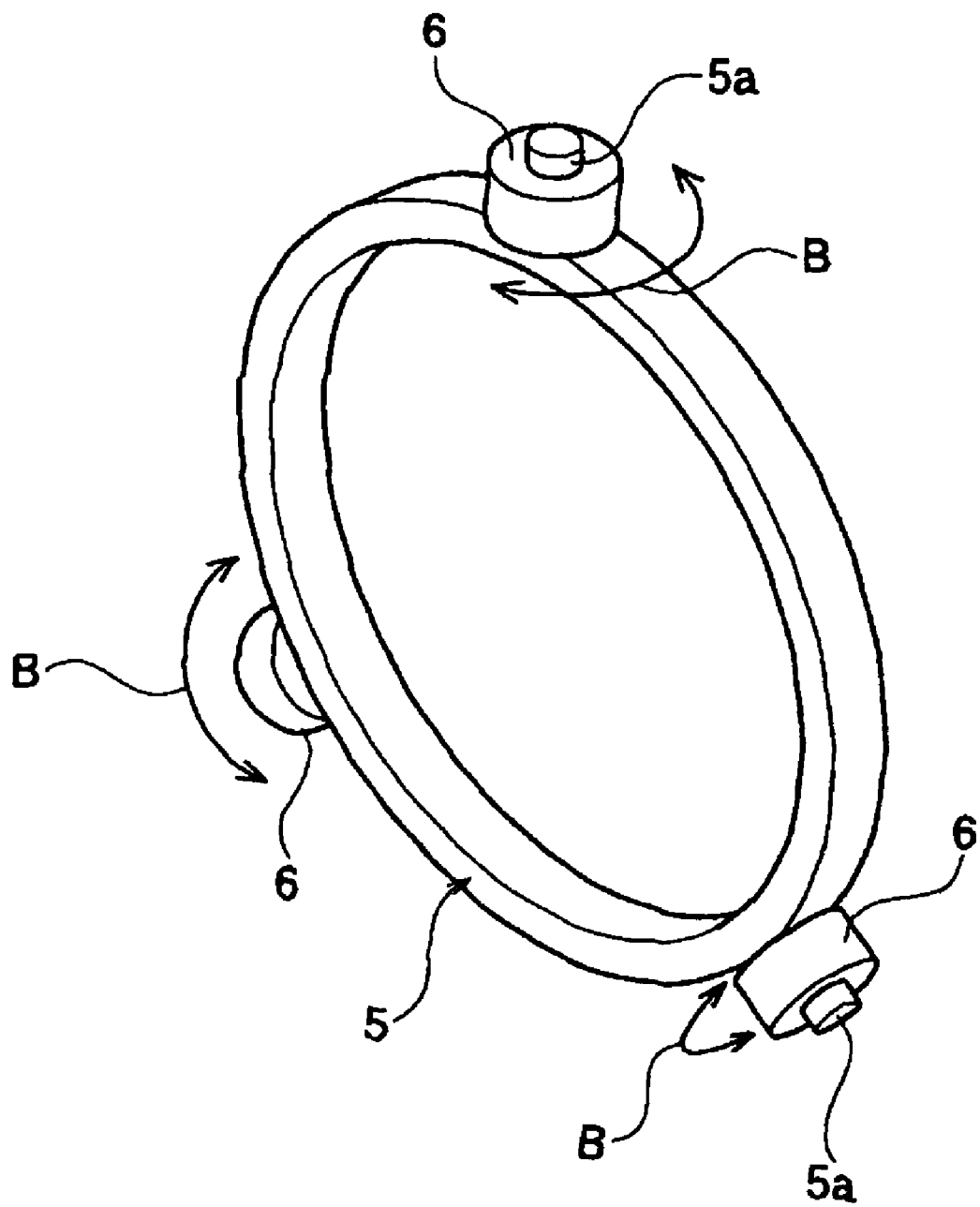
FIG. 2 is a perspective view of an output ring and a planetary roller shown in FIG. 1.
Figure 3A:
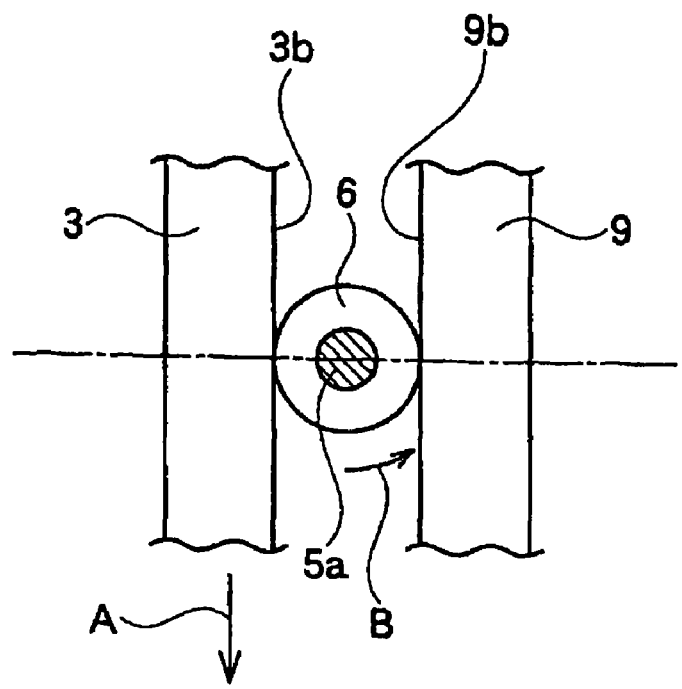
FIG. 3A and FIG. 3B is schematic views showing relation of relative movement of the planetary roller to the operation ring and the driving ring.
Figure 3B:
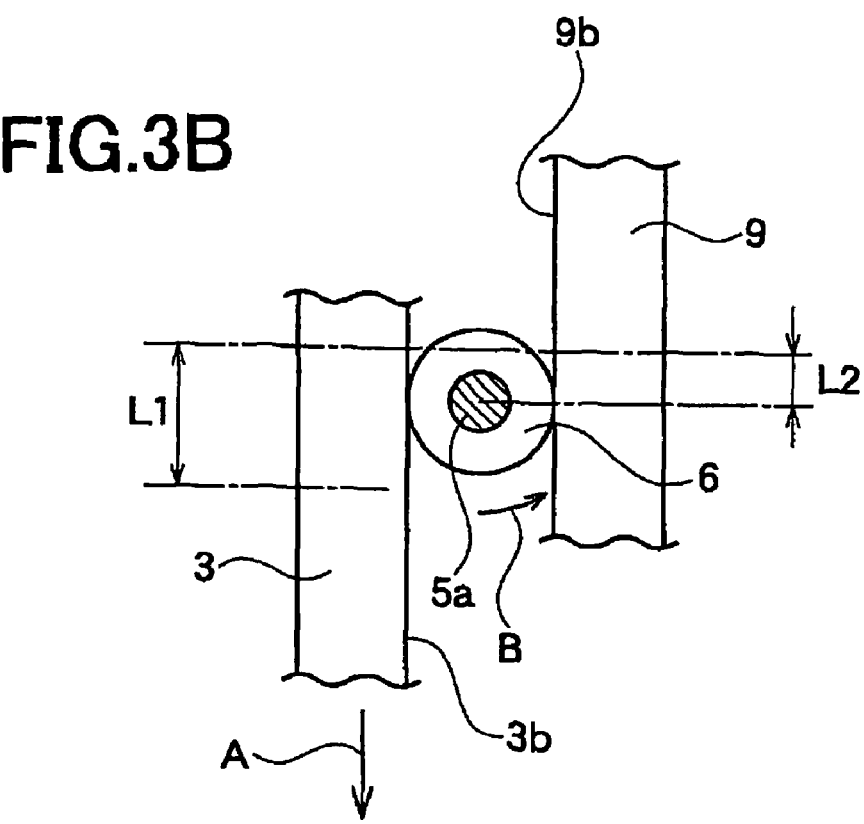

As shown in FIG. 2, at an outer circumference of the output ring 5, a plurality of planetary axis 8a (three in the drawing) are formed at about equal spaces in circumference direction, outwardly in a radial direction which is perpendicular to the circumference direction. At the respective planetary axis 5a, rollers (planetary rollers) 6 are provided so as to rotate around the planetary axis 5a to arrowed directions B. Outer diameter of the roller 6 is larger than a width of an axial direction of the output ring 5, and the outer circumference of the roller 6 is projected from both ends of the axial direction of the output ring 5, and engages both an end face 3b of the operation ring 3 (hereinafter referred as "a first sliding face") and an end face 9b of the driving ring 9 (hereinafter referred as "a second sliding face"), as shown in FIG. 1, FIG. 3(A) and FIG. 3(B).

In this driving device 30, when a user turns the operating grip 4, resulting in a rotation movement around the shaft axis X by the operation ring 3. When a direction of the rotation movement is shown as arrowed direction A in FIG. 3(A) and FIG. 3(B), the planetary roller 6 engaged to the first sliding face 3b is rotated to the arrowed direction B.

Then, the driving ring 9 remains stationary by a friction torque generated by crimping the rotor 23 and the elastic member 22 of the vibration motor 20 shown in FIG. 1, namely, by a holding torque when the motor is electrically disconnected. As a result, the planetary roller 6 rotates to the arrowed direction B, the output ring 5 rotates around the shaft axis X, and the output ring 5 rotatably moves at a predetermined moving amount L2 to a moving amount L1 of the operation ring 3 to the arrowed direction A.

Also, when the rotor 23 moves with applying an alternate current voltage to the piezoelectric 21 of the vibration motor 20 as a driving source, the driving ring 9 rotates around the shaft axis X so as to rotate the planetary rollers 6 as with the rotation of the operation ring 3 as stated above. Then, the operation ring 3 remains stationary since a pressure force of the pressure member 27 provides a force between a sliding support ring 2 and the operation ring 3 to generate a friction torque. Therefore, the output ring 5 rotatably moves by the rotation of the driving ring 9 as similar to the above-described rotation of the operation ring 3.

As stated above, the output ring 5 selectively rotates in response to the two types of inputs of the driving force from the user operation or the driving source. The rotation movement is transmitted to the lens housing 8 via the fork 7 attached to the output ring 5 and the engagement pin 10, and is converted to a linear motion of the shaft axis X direction of the lens housing 8 to finally realize a desired lens driving.

In the present embodiment, in the operation ring 3 composed by a synthetic resin (base material resin) such as fiber glass containing polycarbonate for example, a lubricating paint including fluorine is coated to the first sliding face 3b which is a sliding portion with the planetary roller 6, by air brush. Thereafter, baking is performed to form a low friction member layer, having a lower friction coefficient than that of the base material resin, on the first sliding face 3b of the operation ring 3. A thickness of the lower friction member of the sliding face (a thickness of the lubrication coating) is 2 to 30 μm.

The friction coefficient (both static friction coefficient and dynamic friction coefficient) of the first sliding face 3b (surface of lower friction member layer) to a metal planetary roller 6 is lower than a surface of the base material resin of the operation ring 3, and preferably 90% or less, more preferably 80% or less and particularly preferably 70% or less when the friction coefficient of the base material resin is 100%. The second sliding face 9b of the driving ring 9 is composed by, for example, a resin similar to the base material resin of the operation ring 3. Therefore, the friction coefficient of the first sliding face 3b is preferably 90% or less, more preferably 80% or less and particularly preferably 70% or less when the friction coefficient of the second sliding face 9b is 100%. However, when the friction coefficient of the first sliding face 3b is too low, it becomes difficult to transmit the rotation force of the operation ring 3 to the planetary roller 6. Therefore, it is preferable that the friction coefficient of the first sliding face 3b is 30% or higher to the friction coefficient of the second sliding face 9b.

The planetary roller 6 is composed by metal for improving mechanical strength and slipping properties. As a metal to compose the planetary roller, although not particularly limited, alloys such as stainless and brass may be mentioned. In the case of brass, it is preferable to plate with Ni—P metallizing plating, Ni—Cr metallizing plating, etc., on the surface. The driving ring 9 is composed by a resin similar to the base material resin of the operation ring 3.

In the present embodiment, when the user turns the operating grip 4, the planetary rollers 6 rotates via the operation ring 3, and the output ring 5 rotates around the shaft axis X. Also, if the user further attempts to move the operating grip 4 so as to move the lens housing 8 further from the axial direction end portion when the lens housing 8 moves to an axial direction end portion of the movable area, it certainly results in slipping between the first sliding face 3b of the operation ring 3 and the planetary rollers 6. Therefore, the output ring 5 does not rotate and an excessive force is not applied to the lens hosing 8, so that breakage of the lens hosing 8, the engagement pin 10, etc., can be prevented. Here, the planetary roller 6 and the first sliding face 3b of the operation ring 3 are slipping because the driving ring 9 is fixed due to a holding torque between the elastic member 22 and the rotor 23.

In the present embodiment, it is confirmed that the holding torque generated between the elastic member 22 and the rotor 23, which is required at this time, is drastically reduced than conventional (e.g., by 50% or so). It results in reducing effects of the holding torque reduction due to invasion by foreign material between the elastic member 22 and the rotor 23, and having broader options when selecting materials and surface treatment methods.

Further, in case that the holding torque is reduced due to invasion by foreign material between the elastic member 22 and the rotor 23, a problem may occur that performance of the vibration motor is reduced by slipping between the elastic member 22 and the rotor 23. However, according to the present embodiment, the performance of the vibration motor is not reduced because it is possible to prevent slipping between the elastic member 22 and the rotor 23 when the holding torque is reduced.

Next, when the vibration motor 20 is driven, the planetary rollers 6 roll over the first sliding face 3b of the operation ring 3 and the torque transmitted to the driving ring 9 is transmitted to the output ring 5 to rotate the output ring 5 around the shaft axis X, so that the lens housing 8 moves toward the shaft axis X.

If the first sliding face 3b does not have baking finish by fluorine resin, etc., and is coated with lubricating agents, the lubricating agents are transcribed to the planetary rollers 6 to reduce the friction coefficient between the planetary roller 6 and the driving ring 9, which causes slipping between the planetary roller 6 and the driving ring 9 when the vibration motor 20 is driven. As a result, a necessary torque for moving the lens housing 8 to the shaft axis X direction cannot be obtained.

As a result of confirming a durability, when a thickness of the lubricating coating film is 2 µm or thinner, the lubricating coating film is completely scraped to increase the friction coefficient, so that it is not suitable for using. Further, when the thickness of the lubricating coating film exceeds 30 µm, it is confirmed that a partial scrape residue occurs during durability test and spreads to other members. Therefore, it is most appropriate that the thickness of the lubricating coating film is 2 to 30 µm. When a surface treatment including fluorine is adapted on whole surface of the operation ring 3 to lower the friction coefficient, similar effects can be obtained.

SECOND EMBODIMENT

A driving device and a lens barrel according to the present embodiment are same as those of the above-described first embodiment except for composing the operation ring 3 shown in FIG. 1 of a resin including fluorine having no support ring 3a. Specifically, the operation ring 3 is composed of polycarbonate resin, where glass fiber is added as reinforcement agent and PTFC (polytetrafluoroethylene) resin is mixed for reducing the friction coefficient. It is effective for reducing the friction coefficient to mix the PTFE in an amount of 5 to 20 wt % per the whole.

By using this operation ring 3, it is same as in the first embodiment that the planetary roller 6 rotates via the operation ring 3, and that the output ring 5 rotates around the shaft axis X, when a user turns the operating grip 4. Also, if the user further attempts to rotationally move the operating grip 4 when the lens housing 8 moves to an axial direction end portion of the movable area, it certainly results in slipping between the first sliding face 3b of the operation ring 3 and the planetary roller 6.

It is confirmed that the holding torque generated between the elastic member 22 and the rotor 23, which is required at this time, is drastically reduced than conventional. It results in reducing effects of the holding torque reduction due to invasion by foreign material between the elastic member 22 and the rotor 23, and having broader options when selecting materials and surface treatment methods. With respect to the problem of the foreign material between the elastic member 22 and the rotor 23, the present invention has similar functions and effects to the first embodiment.

Next, when the vibration motor 20 is driven, the planetary rollers 6 roll over the first sliding face 3b of the operation ring 3 and the torque transmitted to the driving ring 9 is transmitted to the output ring 5 to rotate the output ring 5 around the shaft axis X (optical axis), so that the lens housing 8 moves toward the optical axis.

Further, by including PTFE in the operation ring 3, it is eliminated to apply conventional coating of lubricating agent between the sliding support ring 2 and the operation ring 3.

According to the first and the second embodiments of the present invention, by providing the low friction coefficient member layer on the first sliding face 3b of the operation ring 3, or composing the operation ring 3 itself of the low friction coefficient member, the holding torque required between the elastic member 22 and the rotor 23 is reduced. It results in broader options when selecting materials and surface treatment methods. Further, it becomes possible to prevent abnormal noises and a motor performance degradation generated due to slipping between the elastic member 22 and the rotor 23.

Note that the lens barrel of the present embodiment may be a lens barrel removably attached to a single lens reflex camera, and a lens barrel removably attached to other cameras including video camera and other optical devices, or may be one portion of a camera structure wherein integrally and irremovably installed.

The invention claimed is:

1. A driving device for an optical component comprising:
an operation ring to which a driving force from an operation member is transmitted;
a driving ring to which a driving force from an actuator is transmitted;
an output ring which transmits a driving force to an optical component; and
a planetary roller which contacts with one end face of said operation ring and one end face of said driving ring, said planetary roller being rotatably attached to said output ring so as to selectively transmit the driving force from any one of said operation ring and said driving ring to said output ring; wherein
a friction coefficient of a first face, which is a contact face of said operation ring with said planetary roller, is lower than a friction coefficient of a second face, which is a contact face of said driving ring with said planetary roller,
said operation ring and said planetary rollers slip therebetween when the driving force is transmitted to said operation ring after said optical component reaches an end portion of a movable area,
said first face of said operation ring consists of a lower friction member than a body portion of said operation ring,
the member of said first face is a lubricating coating film, and
a thickness of said lubricating coating film is 2 to 30 µm.

2. The driving device as set forth in claim 1, wherein a rotational axis of said planetary roller is formed in a radial direction of said output ring.

3. The driving device as set forth in claim 2, wherein an external diameter of said planetary roller is larger than an axial direction width of said output ring.

4. The driving device as set forth in claim 1, wherein a material of said operation ring comprises fluorine.

5. The driving device as set forth in claim 4, wherein said material comprising fluorine is polytetrafluoroethylene.

6. The driving device as set forth in claim 1, wherein the member of said first face comprises fluorine.

7. The driving device as set forth in claim 1, wherein said actuator is a vibration motor.

8. A lens barrel comprising:
the driving device as set forth in claim 1;
a converting member to convert a driving force transmitted to said output ring to rectilinear motion; and
a lens driven by the converted driving force by said converting member.

9. A driving device for an optical component comprising:
an operation ring to which a driving force from an operation member is transmitted;
a driving ring to which a driving force from an actuator is transmitted;
an output ring which transmits a driving force to an optical component; and
a planetary roller which contacts with one end face of said operation ring and one end face of said driving ring, said planetary roller being rotatably attached to said output ring so as to selectively transmit the driving force from any one of said operation ring and said driving ring to said output ring; wherein
a contact face of said operation ring with said planetary roller consists of a lower friction member than a body portion of said operation ring,
said operation ring and said planetary rollers slip therebetween when the driving force is transmitted to said operation ring after said optical component reaches an end portion of a movable area,
a contact face member of said planetary roller comprises fluorine,
the contact face member of said planetary roller is a lubricating coating film, and
a thickness of said lubricating coating film is 2 to 30 μm.

10. The driving device as set forth in claim 9, wherein a rotational axis of said planetary roller is formed in a radial direction of said output ring.

11. The driving device as set forth in claim 10, wherein an external diameter of said planetary roller is larger than an axial direction width of said output ring.

12. The driving device as set forth in claim 9, wherein said actuator is a vibration motor.

13. A lens barrel comprising:
the driving device as set forth in claim 9;
a converting member to convert a driving force transmitted to said output ring to rectilinear motion; and
a lens driven by the converted driving force by said converting member.

14. A driving method of an optical component comprising:
providing an operation ring to which a driving force from an operation member is transmitted;
providing a driving ring to which a driving force from an actuator is transmitted;
providing an output ring which transmits a driving force to an optical component;
providing a planetary roller which contacts with one end face of said operation ring and one end face of said driving ring, said planetary roller being rotatably attached to said output ring so as to selectively transmit the driving force from any one of said operation ring and said driving ring to said output ring; and
making a friction coefficient of a first face, which is a contact face of said operation ring with said planetary roller, lower than a friction coefficient of a second face, which is a contact face of said driving ring with said planetary roller; wherein
said operation ring and said planetary rollers slip therebetween when the driving force is transmitted to said operation ring after said optical component reaches an end portion of a movable area,
said first face of said operation ring consists of a lower friction member than a body portion of said operation ring,
the member of said first face consists of a lubricating coating film, and
a thickness of said lubricating coating film is 2 to 30 μm.

15. The driving method of an optical component as set forth in claim 14, wherein
a rotational axis of said planetary roller is formed in a radial direction of said output ring.

16. The driving method of an optical component as set forth in claim 15, wherein
an external diameter of said planetary roller is larger than an axial direction width of said output ring.

17. The driving method of an optical component as set forth in claim 14, wherein
a material comprising fluorine is used for said operation ring.

18. The driving method of an optical component as set forth in claim 17, wherein
polytetrafluoroethylene is used for said material comprising fluorine.

19. The driving method of an optical component as set forth in claim 14, wherein
a material comprising fluorine is used for the member of said first face.

20. The driving method of an optical component as set forth in claim 14, wherein
a vibration motor is used as said actuator.

21. A driving method of an optical component comprising:
providing an operation ring to which a driving force from an operation member is transmitted;
providing a driving ring to which a driving force from an actuator is transmitted;
providing an output ring which transmits a driving force to an optical component;
providing a planetary roller which contacts with one end face of said operation ring and one end face of said driving ring, said planetary roller being rotatably attached to said output ring so as to selectively transmit the driving force from any one of said operation ring and said driving ring to said output ring; and
making a contact face of said operation ring with said planetary roller lower in friction than a body portion of said operation ring; wherein
said operation ring and said planetary rollers slip therebetween when the driving force is transmitted to said operation ring after said optical component reaches an end portion of a movable area,
a contact face member of said planetary roller consists of a lubricating coating film, and
a thickness of said lubricating coating film is 2 to 30 μm.

22. The driving method of an optical component as set forth in claim 21, wherein
a rotational axis of said planetary roller is formed in a radial direction of said output ring.

23. The driving method of an optical component as set forth in claim 22, wherein
an external diameter of said planetary roller is larger than an axial direction width of said output ring.

24. The driving method of an optical component as set forth in claim 21, wherein a material comprising fluorine is used for a contact face member of said planetary roller.

25. The driving method of an optical component as set forth in claim 21, wherein a vibration motor is used as said actuator.

26. The driving device as set forth in claim 1, wherein the friction coefficient of said first face is 30% or higher and 90% or less of the friction coefficient of said second face.

27. The driving method of an optical component as set forth in claim 14, wherein the friction coefficient of said first face is 30% or higher and 90% or less of the friction coefficient of said second face.

* * * * *